P. C. ICKES.
KNOCKDOWN TANK.
APPLICATION FILED MAY 12, 1919.
1,381,877. Patented June 14, 1921.
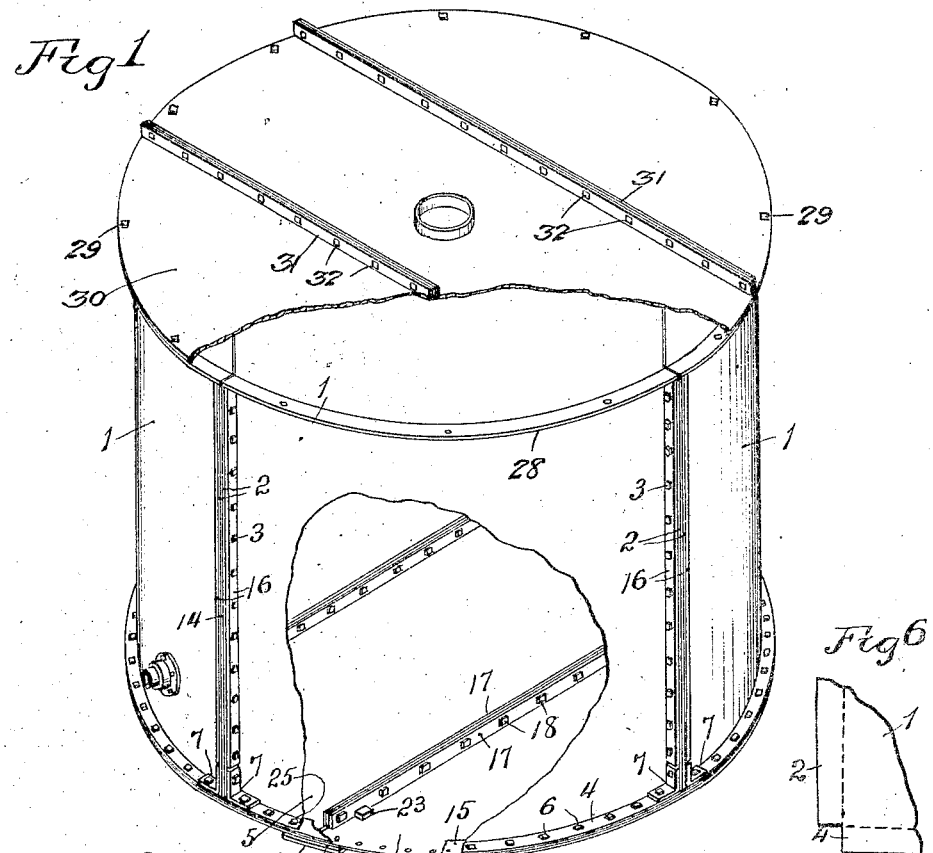
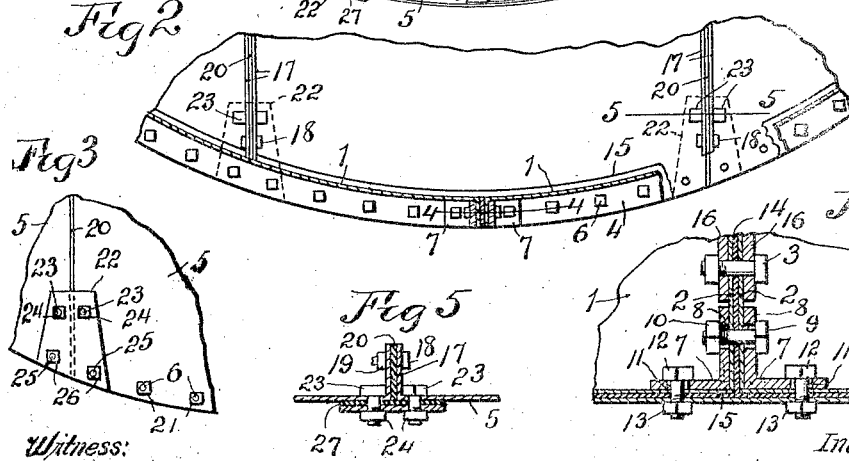
Witness:
R. E. Hamilton
Inventor,
Peter C. Ickes,
By Warren D. House,
His Attorney.

UNITED STATES PATENT OFFICE.

PETER C. ICKES, OF CHANUTE, KANSAS, ASSIGNOR OF ONE-HALF TO EDWARD T. NEYHARD, OF CHANUTE, KANSAS.

KNOCKDOWN TANK.

1,381,877. Specification of Letters Patent. Patented June 14, 1921.

Application filed May 12, 1919. Serial No. 296,462.

*To all whom it may concern:*

Be it known that I, PETER C. ICKES, a citizen of the United States, residing at Chanute, in the county of Neosho and State of Kansas, have invented a certain new and useful Improvement in Knockdown Tanks, of which the following is a specification.

My invention relates to improvements in knock-down tanks.

It relates particularly to large tanks used for storing oil in the fields.

One of the objects of my invention is to provide a tank of the kind described, which can be readily assembled by unskilled labor in the field where it is to be used, which can be built up on the ground where it is to be used, without having to be mounted, as is usual with tanks of this character upon a structure in an elevated position above the ground.

My invention provides further novel means for connecting together the bottom sections of the tank, in a manner such that the workman who is doing the assembling can connect the bottom sections while at work above them and without having to get under the tank.

My invention provides further novel means for connecting together the bottom and side sections of the tank.

My invention provides still further novel means for securely closing the joints between the bottom sections and the side sections.

Other novel features of my invention are hereinafter fully described and claimed.

In the accompanying drawing which illustrates the preferred embodiment of my invention, Figure 1 is a perspective view, partly broken away, of my improved tank.

Fig. 2 is a fragmental horizontal sectional view of the same.

Fig. 3 is an under view of a portion of the bottom of the tank.

Fig. 4 is an enlarged vertical sectional view on the line 4—4 of Fig. 2.

Fig. 5 is an enlarged vertical sectional view on the line 5—5 of Fig. 2.

Fig. 6 is a stretch-out view of a corner portion of the side sections before the flanges have been formed thereon.

Similar reference characters designate similar parts in the different views.

1 designates each of a plurality of side sections, each provided at opposite longitudinal edges with vertical, preferably outwardly extending, flanges 2 connected by horizontal bolts 3 with the adjacent vertical flanges of the adjacent sections 1. Each side section 1 is provided at its lower end with a peripheral, preferably outwardly extending horizontal flange 4 which is connected to the adjacent bottom sections 5 by vertical bolts 6.

For more securely fastening the bottom sections 5 to the side sections 1, I provide right-angle plates 7, Fig. 4, which are arranged in pairs, the vertical arms of which are disposed respectively against the adjacent sides of adjacent flanges 2, the vertical arms being provided each with a vertical slot 8, through which extends a horizontal bolt 9 provided with a nut 10.

The horizontal arms of the angle plates 7 are provided each with a horizontal longitudinal slot 11, through which extends a vertical bolt 12 provided with a nut 13 which bears against the under side of the adjacent bottom section 5. The bolt 12 extends through the adjacent flange 4 and the adjacent bottom section 5.

By providing the slots 8 and 11 in the two arms of each angle plate 7, vertical movement or adjustment of the bolts 9 and 12 in said slots may be obtained, thus permitting the nuts on said bolts to be securely tightened and to prevent leakage at the joints.

Interposed between the flanges 2 is a packing strip 14. Interposed between the bottom sections 5 and the flanges 4 is packing 15.

Clamped respectively to the outer side of each flange 2 by the bolts 3 may be vertical clamping bars 16.

The longitudinal edge of each bottom section 5 which is adjacent to another bottom section is provided with an upwardly turned flange 17, Fig. 5, and Fig. 1, which is clamped to the adjacent flange 17 by horizontal bolts 18 provided with nuts 19. Intermediate of adjacent flanges 17 is provided packing 20. The bolts 6 are provided each on its lower end with a nut 21 which bears against the adjacent bottom section 5.

The ends of the flanges 17 preferably terminate against the inner wall of the adjacent side sections 1, as shown in Fig. 2. For preventing leakage at the ends of the flanges 17, I provide horizontal sealing plates

22, each of which overlaps two adjacent bottom sections 5, to which the plate 22 is secured by vertical bolts 23 provided on their lower ends with nuts 24 which bear against the under side of the plate 22. The plate 22 extends under the adjacent flange 4, to which it is connected by vertical bolts 25, Fig. 3, which extend through the adjacent flange 4 and the plate 22 and are provided each on its lower end with a nut 26 which bears against the under side of the plate 22.

Packing 27 is interposed between the plate 22 and the bottom sections 5.

Each side section 1 is provided at its upper end with an outwardly extending peripheral flange 28 to the upper side of which may be bolted by bolts 29, top sections 30 each having an upwardly extending flange 31 connected by bolts 32 to the adjacent flange 31 of the adjacent top section 30, Fig. 1.

In the assembling of my improved tank, which may be effected in the field at the place where the tank is to be used, it is unnecessary to support the tank in an elevated position in order to bolt the bottom sections together and to the side sections, as the upwardly extending flanges 17 of the bottom sections permit the workman, who is doing the assembling, to work from above the bottom sections, instead of having, as in the usual manner, to have the tank in an elevated position so that access may be had from below. The bottom sections 5 having been bolted together, the side sections then have their flanges 4 bolted to the upper sides of the bottom sections and the flanges 2 bolted together.

The angle plates 7 are then bolted to the flanges 4 and the flanges 2, the adjustability of the bolts 9 and 12 in the slots 8 and 11 permitting the parts to be drawn tightly together without buckling or cramping.

The plates 22 are then bolted to the bottom plates 5 so as to cover the joints at the ends of the flanges 17. As the plates 22 are closely adjacent to the periphery of the tank, access may be readily had for the application of the nuts 24 and 26 to the bolts 23 and 25. Likewise the bolts 6 and 12 being close to the periphery of the tank, the nuts 13 and 21 may be readily applied without having the tank elevated, such space as may be needed being obtainable by scooping a small amount of dirt from beneath the tank at its outer edge. With tanks of such large dimensions and weight as are used for storing oil in the field, there is great advantage in being able to assemble the tank on the ground in the position which it is to occupy and without having to provide a raised platform for supporting the tank. With my improved construction this result is readily obtainable. A single workman may without assistance assemble in operative condition a very large tank constructed in accordance with the principles of my invention, and this may be readily done at the place where the tank is to be used.

What I claim is:—

1. In a knockdown tank, a side section having at its lower end an outwardly extending peripheral flange, two bottom sections bolted to the under side of said flange, each having an upwardly extending flange bolted to the corresponding flange of the other bottom section, a sealing plate overlapping said upwardly extending flanges and overlapping and being bolted to said two bottom sections and said outwardly extending peripheral flange, and packing between the bottom sections and said peripheral flange, between the bottom sections and the sealing plate, and between said upwardly extending flanges.

2. In a knock down tank, two side sections each having vertical flanges bolted to the corresponding vertical flanges of the adjacent side sections and each having at its lower end a laterally extending flange, a bottom section at the under side of said laterally extending flanges overlapping said side sections, packing between said bottom section and said laterally extending flanges, and between said vertical flanges, two angle plates each having a vertical arm and a horizontal arm, the vertical arms each having a vertical slot and the horizontal arms each having a horizontal longitudinal slot, the vertical arms respectively embracing said vertical flanges, and the horizontal arms respectively embracing said lateral flanges, a bolt extending through said vertical slots and vertical flanges, and two bolts extending respectively through said horizontal slots and through said laterally extending flanges and said bottom section.

In testimony whereof I have signed my name to this specification.

PETER C. ICKES.